United States Patent Office 2,894,733
Patented July 14, 1959

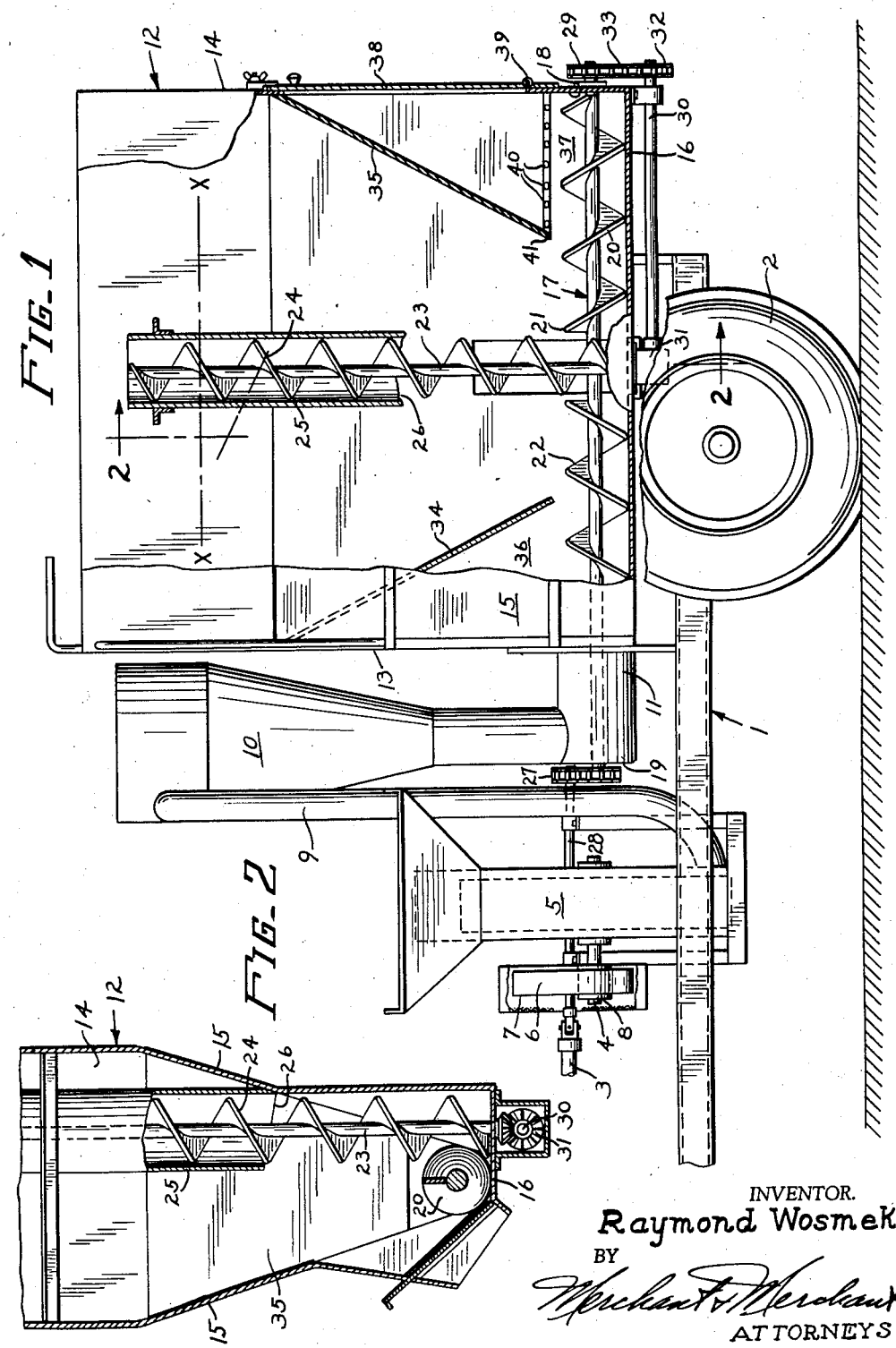

2,894,733

PORTABLE GRINDING AND MIXING DEVICE FOR STOCK FEED

Raymond Wosmek, Glencoe, Minn.

Application March 7, 1958, Serial No. 719,965

1 Claim. (Cl. 259—23)

My invention relates generally to farm implements and more specifically to stock feeding equipment.

More specifically my invention relates to improvements in portable grinding and mixing devices for stock feed and has for its primary object the provision of a device of the class above described wherein efficient and thorough mixing of the granular stock feed within the mixing bin may be achieved with a minimum of power.

A further object of my invention is the provision of a device of the class above described wherein additives may be thoroughly added to the mixture within the mixing bin at a low level with a minimum of time and effort and without escape of any of the contents within the mixing bin.

A still further object of my invention is the provision of a device of the class described which has a minimum of working parts, which is rugged and durable in construction, and which is highly efficient in its operation.

The above and still further objects of my invention will become apparent from the following detailed specification, appended claim and attached drawings.

Referring to the drawings wherein like characters indicate like parts throughout the several views:

Fig. 1 is a view in side elevation of my novel device, some parts being broken away and some parts shown in section; and Fig. 2 is a fragmentary view in vertical section as seen substantially from the line 2—2 of Fig. 1.

Referring with greater particularity to the drawings, the numeral 1 indicates in its entirety a horizontally disposed generally rectangular frame, which, for purposes of portability, is provided at its rear end with suitable wheels 2. The front end portion of the frame 1, not shown, may be provided with any suitable means for coupling the same to a tractor, whereby the power take-off shaft 3 thereof may be caused to impart rotary movements to the shaft 4 of a conventional grinder or hammermill 5. As shown, this is accomplished through the medium of a belt 6 running over a relatively large pulley 7 and over a relatively small pulley 8 on the extended end of the shaft 4. Ground oats, corn or other grains, after being processed in the hammermill 5, are elevated through a vertical boot 9 into a hopper 10 which, in turn, feeds into a tubular extension 11 projecting longitudinally forwardly of a mixing bin 12. The front and rear end walls of the mixing bin 12 are identified by the numerals 13 and 14 respectively, whereas the downwardly converging side walls thereof are identified by the common numeral 15. The end walls 13, 14 and the downwardly converging side walls 15 define a hopper-like bottom 16. A horizontally disposed conveyor 17 has its rear end journaled in the rear end wall 14 of the mixing bin 12, as indicated at 18, and has its forward end journaled in the front end wall 19 of the tubular extension 11. Conveyor 17 has a rear flight 20 which feeds from the rear end wall 18 in a forward direction, where it terminates as indicated at 21, in spaced relation to a front flight 22 which feeds rearwardly from the front wall 19 of the tubular extension 11, in underlying relationship to the hopper 10.

A vertical conveyor 23 has its lower end journaled in the bottom wall 16 of the mixing bin 12 in close proximity to the intermediate portion of the horizontal conveyor 17 with the flight 24 thereof partially received within the space between the front and rear flights 22 and 20 respectively thereof, as shown in Fig. 2.

Preferably and as shown, the upper end of the vertical conveyor 23 is housed within an elongated sleeve 25 which terminates at its lower end in vertically spaced relation to the horizontal conveyor 17, as indicated at 26. Sleeve 25 projects above the normal level of granular ingredients of the mixing bin 12, as indicated by the dot-dash line X—X, and thus assures a constant lifting up of the granular ingredients from a point immediately above the point of maximum agitation, to wit: the space between the front and rear flights 22, 20 of the horizontal conveyor 17, thereby greatly increasing the mixing efficiency of my device.

Rotary conveying movements are imparted to the horizontal conveyor 17 by any suitable means such as a chain-equipped sprocket 27, the chain of which, in turn, is also connected to a sprocket, not specifically identified but mounted on a shaft 28 having drive connections with the power take-off shaft 3. On the other hand, rotary conveying movements are imparted to the vertical conveyor 23 by any suitable means such as a sprocket 29 on the projected rear end of the conveyor 17, a shaft 30 journaled for rotation beneath the hopper bottom 16 and gear connections 31, as shown in Fig. 2. On its rear end, the shaft 30 is shown as also having a sprocket 32, over which is entrained and the sprocket 29, a chain 33.

Carried by the front and rear end walls 13, 14, as well as the converging side walls 15, and converging downwardly are front and rear baffles 34 and 35 respectively which terminate at their lower ends in closely spaced overlying relationship to the vertical conveyor 17 and in spaced relation to the vertical conveyor 23. These baffles not only serve the important function of feeding the granular material within the mixing bin 12 toward the space between the front and rear flights 22, 20 of the horizontal conveyor 17 and the lower end of the vertical conveyor 23, but also create voids 36 and 37 over the front and rear end portions of this horizontal conveyor 17, thereby materially reducing the power which is required to impart rotary conveying movements to the horizontal conveyor 17.

The rear end wall 14 of the mixing bin 12 is provided with a door 38, shown as being hinged as at 39, which communicates with the void 37. A horizontally disposed perforate grid 40 extends between the wall 14 and the lower end portion 41 of the baffle 35 in overlying relationship to the horizontal conveyor 17 and makes possible the feeding of additives into the mixing bin 12 through the door 38 without danger of the operator's hands becoming involved in the rear flight 20 of said conveyor 17. Obviously, with this novel arrangement, the additives can be inserted into the mixing bin at will with a minimum of effort and with a complete assurance that none of the granular contents within the mixing bin 12 will escape.

My invention has been thoroughly tested and found to be completely satisfactory for the accomplishment of the above objects and while I have shown a preferred embodiment thereof, I wish it to be specifically understood that same is capable of modification without departure from the scope and spirit of the appended claim.

What I claim is:

In a device of the class described, a portable frame, a mixing bin on said frame, said bin having substantially vertical end walls and converging side walls which provide a hopper bottom extending longitudinally of the direction of travel of said frame, a horizontally disposed screw conveyor extending through the lower portion of said bin in overlying relation to said hopper bottom and having front and rear flights which are spaced apart centrally of said bin and which feed material toward their spaced apart adjacent ends, a vertically disposed screw conveyor having its lower end in closely spaced relation to the flights of said horizontal conveyor, downwardly converging baffles carried by the end walls and converging side walls of said mixing bin, said baffles terminating at their lower ends in closely spaced overlying relationship to said horizontal conveyor in spaced relation to and on opposite sides of said vertical conveyor and creating voids at opposite ends of said horizontal conveyor, an ingredient inserting door in the rear end wall of said mixing bin opening into the void created by the adjacent baffle, and a perforate grid below the level of said door extending longitudinally between said rear end wall and the adjacent baffle and laterally between said converging side walls.

References Cited in the file of this patent

UNITED STATES PATENTS

| | | |
|---|---|---|
| 2,101,490 | Bullock et al. | Dec. 7, 1937 |
| 2,555,066 | Thomas | May 29, 1951 |
| 2,621,904 | Stauffer | Dec. 16, 1951 |